United States Patent
Kojima et al.

(10) Patent No.: US 11,972,648 B2
(45) Date of Patent: Apr. 30, 2024

(54) APPARATUS, SYSTEM, METHOD AND STORAGE MEDIUM

(71) Applicant: Yokogawa Electric Corporation, Tokyo (JP)

(72) Inventors: Osamu Kojima, Tokyo (JP); Atsushi Wada, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 239 days.

(21) Appl. No.: 17/401,305

(22) Filed: Aug. 12, 2021

(65) Prior Publication Data

US 2022/0068058 A1 Mar. 3, 2022

(30) Foreign Application Priority Data

Sep. 1, 2020 (JP) .................. 2020-146881

(51) Int. Cl.
*G07C 9/00* (2020.01)
*H04N 7/18* (2006.01)

(52) U.S. Cl.
CPC ......... *G07C 9/00174* (2013.01); *H04N 7/181* (2013.01)

(58) Field of Classification Search
None
See application file for complete search history.

(56) References Cited

U.S. PATENT DOCUMENTS

| | | | | |
|---|---|---|---|---|
| 7,847,675 B1* | 12/2010 | Thyen | ............... | G07C 9/00896 340/5.31 |
| 8,179,227 B2* | 5/2012 | Dziadosz | ................ | G07C 9/20 340/5.1 |
| 8,629,755 B2* | 1/2014 | Hashim-Waris | ... | G06Q 30/0601 705/13 |
| 9,865,109 B2* | 1/2018 | Roth | .................. | G07C 9/00571 |
| 10,706,703 B1* | 7/2020 | Barr | ....................... | G08B 13/08 |
| 2002/0067259 A1* | 6/2002 | Fufidio | .................... | G07C 9/28 340/541 |

(Continued)

FOREIGN PATENT DOCUMENTS

EP 2290628 A1 3/2011
JP 2004320512 A 11/2004

(Continued)

OTHER PUBLICATIONS

Office Action issued for counterpart Japanese Application No. 2020-146881, issued by the Japanese Patent Office dated Nov. 22, 2022 (drafted on Nov. 15, 2022).

(Continued)

*Primary Examiner* — Muhammad Adnan

(57) ABSTRACT

Provided is an apparatus including: a first storage unit configured to store image data captured by a plurality of monitoring cameras disposed in a plurality of restricted areas in which entry is restricted by a plurality of electric locks according to an authority associated with each piece of authentication information; and an access control unit configured to permit only a registrant corresponding to the authentication information that allows entry into the restricted area to access the image data captured in the restricted area by any of the plurality of monitoring cameras.

19 Claims, 8 Drawing Sheets

(56) References Cited

U.S. PATENT DOCUMENTS

| | | | | |
|---|---|---|---|---|
| 2005/0036665 A1* | 2/2005 | Higuchi | H04M 1/67 | 382/124 |
| 2007/0096867 A1* | 5/2007 | Denison | G06F 21/76 | 340/5.23 |
| 2010/0245033 A1* | 9/2010 | Sasakuma | G07C 9/27 | 340/5.2 |
| 2011/0072037 A1* | 3/2011 | Lotzer | G06F 16/748 | 725/115 |
| 2011/0145574 A1* | 6/2011 | Ju | H04N 7/185 | 726/28 |
| 2011/0160901 A1* | 6/2011 | Abrams, Jr. | G07F 11/44 | 221/124 |
| 2011/0276609 A1* | 11/2011 | Denison | G07F 9/001 | 707/812 |
| 2011/0289123 A1* | 11/2011 | Denison | G07F 5/26 | 707/812 |
| 2011/0289124 A1* | 11/2011 | Denison | G07F 5/26 | 707/812 |
| 2012/0011366 A1* | 1/2012 | Denison | G07C 9/00571 | 707/812 |
| 2012/0011367 A1* | 1/2012 | Denison | G07F 9/026 | 707/812 |
| 2012/0092510 A1* | 4/2012 | Masters | H04N 23/90 | 348/207.1 |
| 2012/0133482 A1* | 5/2012 | Bhandari | G07C 9/27 | 340/5.2 |
| 2012/0204490 A1* | 8/2012 | Lanigan | E05B 47/0046 | 49/70 |
| 2014/0305352 A1* | 10/2014 | Dowling | G07F 9/009 | 109/38 |
| 2015/0187151 A1* | 7/2015 | Lagerstedt | G07C 9/27 | 340/5.61 |
| 2016/0343187 A1* | 11/2016 | Trani | H01Q 9/0407 | |
| 2017/0070657 A1 | 3/2017 | Yokomizo | | |
| 2017/0169638 A1* | 6/2017 | Belknap | G08B 13/19656 | |
| 2017/0213404 A1* | 7/2017 | Sivalingam | G07C 9/257 | |
| 2018/0033235 A1* | 2/2018 | Dotterweich | G07F 17/12 | |
| 2019/0073842 A1* | 3/2019 | Lee | G07C 9/00571 | |
| 2019/0098504 A1* | 3/2019 | Van Betsbrugge | G06Q 10/087 | |
| 2020/0234553 A1* | 7/2020 | Kamio | G06V 40/172 | |
| 2020/0280573 A1* | 9/2020 | Johnson | G06N 20/00 | |
| 2022/0044190 A1* | 2/2022 | Estill | G06Q 10/0832 | |
| 2022/0215706 A1* | 7/2022 | Wakako | G08B 13/19645 | |

FOREIGN PATENT DOCUMENTS

| | | |
|---|---|---|
| JP | 2005031984 A | 2/2005 |
| JP | 2005167523 A | 6/2005 |
| JP | 2007206856 A | 8/2007 |
| JP | 2015162232 A | 9/2015 |

OTHER PUBLICATIONS

Extended European Search Report for European Patent Application No. 21191941.0, issued by the European Patent Office dated Jan. 28, 2022.

* cited by examiner

APPARATUS, SYSTEM, METHOD AND STORAGE MEDIUM

The contents of the following Japanese patent application(s) are incorporated herein by reference:
2020-146881 filed in JP on Sep. 1, 2020

BACKGROUND

1. Technical Field

The present invention relates to an apparatus, a system, a method, and a recording medium.

2. Related Art

Conventionally, various security systems using monitoring cameras have been proposed (see, for example, Patent Document 1).
Patent Literature 1: Japanese Patent Application Publication No. 2015-162232

SUMMARY

In a first aspect of the present invention, an apparatus is provided. The apparatus may include a first storage unit that stores image data captured by each of a plurality of monitoring cameras disposed in a plurality of restricted areas in which entry is restricted by a plurality of electric locks according to the authority associated with each piece of authentication information. The apparatus may include an access control unit that permits only a registrant corresponding to authentication information that allows entry into the restricted area to access image data captured in the restricted area by any of the plurality of monitoring cameras.

In a second aspect of the present invention, a system is provided. The system may include the apparatus of the first aspect. The system may include a plurality of monitoring cameras disposed in a plurality of restricted areas in which entry is restricted by a plurality of electric locks according to the authority associated with each piece of authentication information.

In a third aspect of the present invention, a method is provided. The method may include a storage stage of storing image data captured by a plurality of monitoring cameras disposed in a plurality of restricted areas in which entry is restricted by a plurality of electric locks according to the authority associated with each piece of authentication information. The method may include an access control stage of permitting only a registrant corresponding to authentication information that allows entry into the restricted area to access image data captured in the restricted area by any of the plurality of monitoring cameras.

In a fourth aspect of the present invention, a recording medium in which a program is recorded is provided. The program may cause the computer to function as a first storage unit that stores image data captured by a plurality of monitoring cameras disposed in a plurality of restricted areas in which entry is restricted by a plurality of electric locks according to the authority associated with each piece of authentication information. The program may cause the computer to function as an access control unit that permits only a registrant corresponding to authentication information that allows entry into the restricted area to access image data captured in the restricted area by any of the plurality of monitoring cameras.

Note that the above-described summary of the invention does not enumerate all the necessary features of the present invention. Further, a sub-combination of these feature groups can also be an invention.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

1. First Embodiment

1.1. Security System 1

Figure 1:
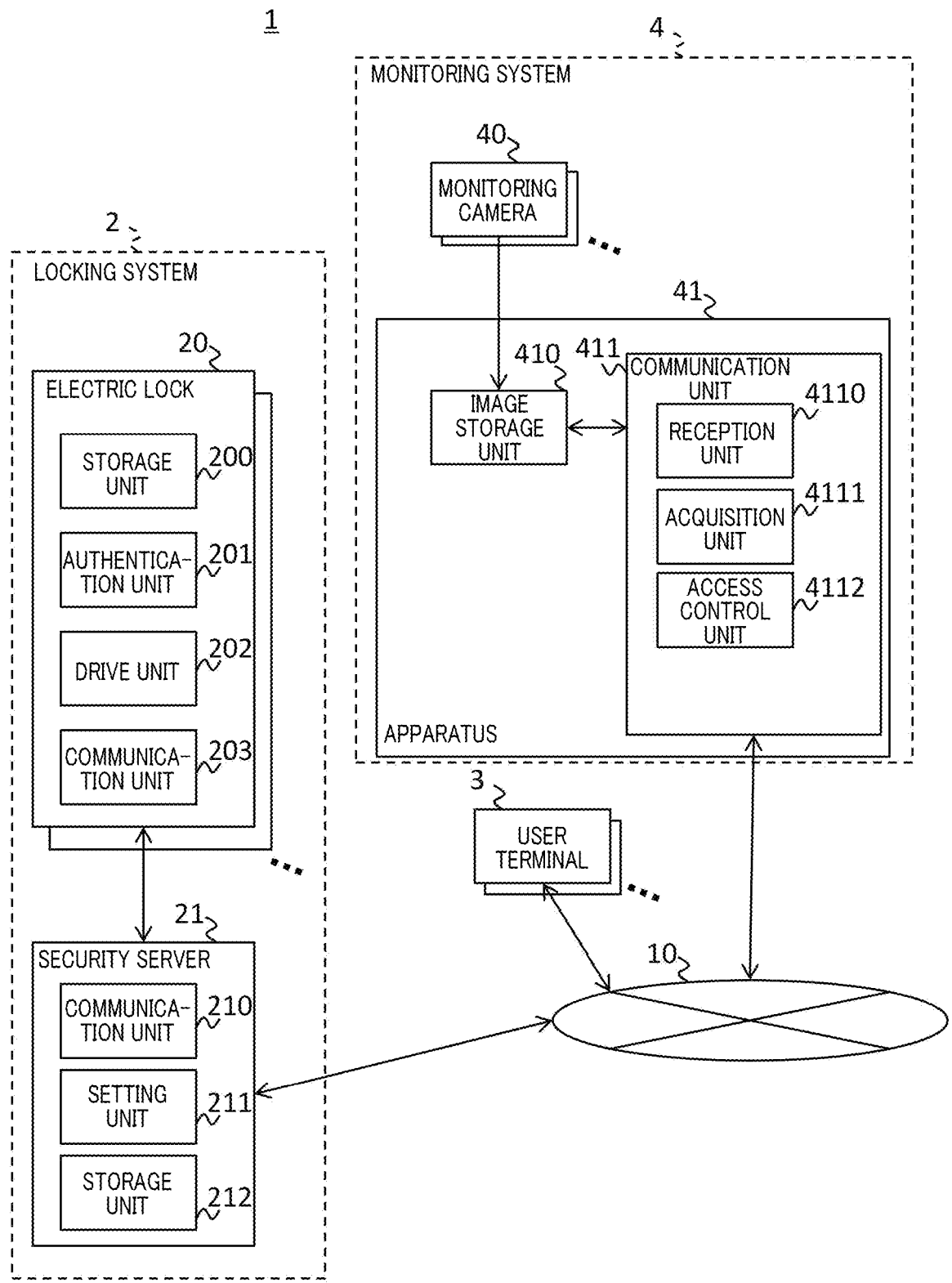
FIG. 1 illustrates a security system 1 according to a first embodiment.

FIG. 1 illustrates a security system 1 according to a first embodiment. The security system 1 includes a security system (also referred to as a locking system) 2 using an electric lock 20, a plurality of user terminals 3, and a security system (also referred to as a monitoring system) 4 using a monitoring camera 40.

Here, the locking system 2, the user terminal 3, and the monitoring system 4 may be connected to each other via a communication network 10. In the drawing, the locking system 2, the user terminal 3, and the monitoring system 4 are connected via a single communication network 10, but may be connected via different communication networks.

The communication network 10 may include various networks such as the Internet, a wide area network (WAN), and a local area network, or a combination thereof. The communication network 10 may include at least one of wired or wireless connection points. The communication network 10 may be realized by a dedicated line separated from a public line such as the Internet.

[1.1(1). Locking System 2]

The locking system 2 is an example of a security system corresponding to the electric lock 20, and includes a plurality of electric locks 20 and a security server 21.

[1.1(1-1). Electric Lock 20]

The plurality of electric locks 20 restrict entry to a restricted area according to an authority associated with authentication information. In the present embodiment, as an example, the authentication information may be identification information of a key (also referred to as a key ID). The key ID may be information unique to each key or information common to two or more keys. The key ID may be physically provided on the surface of the key by engraving, printing, or bonding, or may be magnetically or electrically provided on the surface or inside of the key by an RF tag.

Each electric lock 20 may be provided at an entrance of the restricted area. Each electric lock 20 may be provided in a facility. The facility may be a plant, or may be a school, a house, a station, a museum, a hospital, a store (for example, a restaurant), or the like. Examples of the plant include industrial plants such as chemical plants and bio plants, plants that manage and control well sources such as gas fields and oil fields and surroundings thereof, plants that manage and control power generation such as hydraulic power, thermal power, and nuclear power, plants that manage and control environmental power generation such as solar power and wind power, and plants that manage and control water/sewerage, dams, and the like.

Each electric lock 20 may lock and unlock an entrance, or may be a lock incorporating a mechanism for electrical locking/unlocking. A key used for locking/unlocking may be formed in a card shape.

At least one of a locking operation or an unlocking operation on at least one of the inside or the outside of the entrance may be enabled for each electric lock 20. In the present embodiment, as an example, for each electric lock 20, an unlocking operation may be enabled at least outside the entrance of the restricted area. The electric lock 20 includes a storage unit 200, an authentication unit 201, a drive unit 202, and a communication unit 203.

1.1(1-1-1). Storage Unit 200

The storage unit 200 stores the authority for each key ID. The storage unit 200 may store each key ID and the locking/unlocking authority set for the key ID in association with each other.

The storage unit 200 may further store history data of locking/unlocking. The history data may indicate a time when locking/unlocking has been performed in the past, and may be created by the authentication unit 201 described later.

[1.1(1-1-2). Authentication Unit 201

The authentication unit 201 authenticates a key used to lock and unlock the electric lock 20. The authentication unit 201 may perform authentication by reading the key ID of a key to be used.

In addition, the authentication unit 201 may determine whether locking/unlocking with the authenticated key can be performed. For example, the authentication unit 201 may determine whether locking/unlocking can be performed according to the locking/unlocking authority corresponding to the key ID of the authenticated key. In a case where locking/unlocking is permitted, the authentication unit 201 may supply a drive instruction signal to the drive unit 202. Further, in a case where locking/unlocking is authorized, the authentication unit 201 may create history data of the locking/unlocking and store the history data in the storage unit 200. The authentication unit 201 may create history data including the key ID read from each key to be used. In the present embodiment, as an example, the authentication unit 201 may associate the used key ID with the time when locking/unlocking is performed by the drive unit 202 to obtain history data, and store the history data in the storage unit 200. Even in a case where locking/unlocking is not permitted, the authentication unit 201 may store the key ID and the time of use in the storage unit 200 in association with each other.

1.1(1-1-3). Drive Unit 202

The drive unit 202 locks and unlocks a lock portion of the electric lock 20. In the present embodiment, as an example, the drive unit 202 may perform locking/unlocking in response to the supply of the drive instruction signal from the authentication unit 201. In addition, the drive unit 202 may alternately perform locking/unlocking each time the drive instruction signal is supplied, or may perform unlocking each time the drive instruction signal is supplied and automatically perform locking after a certain period of time has elapsed. The power source of the drive unit 202 may be a battery or a power source provided in the facility.

1.1(1-1-4). Communication Unit 203

The communication unit 203 communicates with the security server 21. In the present embodiment, as an example, the communication unit 203 communicates with the security server 21 via a dedicated line, but may communicate via the communication network 10.

1.1(1-2). Security Server 21

The security server 21 includes a communication unit 210, a setting unit 211, and a storage unit 212.

1.1(1-2-1). Communication Unit 210

The communication unit 203 communicates with each electric lock 20 and communicates with other devices via the communication network 10.

1.1(1-2-2). Setting Unit 211

The setting unit 211 sets, for each of the plurality of electric locks 20, the locking/unlocking authority for each key ID in accordance with an operation of the operator. In addition to or instead of this, the setting unit 211 may set, for each of the plurality of keys, the locking/unlocking authority for each of the electric locks 20 in accordance with an operation of the operator. For example, the setting unit 211 may provide a key ID corresponding to the set locking/unlocking authority on the surface or inside of the key. The setting operation of the authority may be performed by an operator according to an instruction of an owner of the facility or a security company.

The setting unit 211 may store the set authority for each key ID in the storage unit 212. In a case where the authority for each key ID is set for the electric lock 20, the setting unit 211 may supply the set authority for each key ID to the corresponding electric lock 20 and store the authority also in the storage unit 200.

The setting unit 211 may further store identification information (also referred to as a registrant ID) of the registrant registered as the possessor for each key in the storage unit 212 according to the operation of the operator. The registrant may be an employee or an owner of the facility, a security company, or the like. The registrant ID may be an account name, an e-mail address, or the like of the registrant.

1.1(1-2-3). Storage Unit 212

For each key ID, the storage unit 212 may store the locking/unlocking authority for each of the plurality of electric locks 20 and the registration information registered in association with the key ID. The registration information may include a registrant ID of a key. For example, the storage unit 212 may store, for each pieces of identification information (also referred to as an electric lock ID) of the electric lock 20, the key ID, the presence or absence of the locking/unlocking authority set in the key ID for the electric lock 20, and the registrant ID in association with each other.

The storage unit 212 may store, for each electric lock 20, history data of locking/unlocking read from the storage unit 200 of each electric lock 20.

1.1(2). User Terminal 3

The plurality of user terminals 3 are terminals operated by the registrant corresponding to the key ID. Each user terminal 3 may be communicable via the communication network 10, and may communicate with the apparatus 41 and the security server 21 using the registrant ID. The user terminal 3 may be a hand-held terminal (HHT) (for example, a smartphone or a tablet PC) or a may be a stationary PC.

1.1(3). Monitoring System 4

The monitoring system 4 includes a plurality of monitoring cameras 40 and the apparatus 41.

1.1(3-1). Monitoring Camera 40

Each monitoring camera 40 is disposed in a restricted area in which entry is restricted by the electric lock 20, that is, inside the entrance, and captures an image. The monitoring system 4 includes the plurality of monitoring cameras 40, and the plurality of monitoring cameras 40 may be disposed in a plurality of restricted areas. In the present embodiment, as an example, at least one monitoring camera 40 is disposed in each restricted area.

The imaging region of the monitoring camera 40 may or may not include the entrance provided with the electric lock 20. As an example, the imaging region may be the inside of a room located inside the entrance.

The monitoring camera 40 may always capture a moving image, or may capture a still image at a reference interval (for example, 5 seconds). In a case where the monitoring camera 40 captures moving image data, the capturing may be performed at 30 f/s as an example. The monitoring camera 40 may be a visible light camera or an infrared or ultraviolet (for example, an X-ray) camera. The monitoring camera 40 may supply the captured image data to the apparatus 41.

1.1(3-2). Apparatus 41

The apparatus 41 includes an image storage unit 410 and a communication unit 411.

1.1(3-2-1). Image Storage Unit 410

The image storage unit 410 is an example of a first storage unit, and stores image data captured by each of the plurality of monitoring cameras 40. The image storage unit 410 may store the image data captured by the monitoring camera 40 in association with identification information of the monitoring camera 40 (also referred to as a camera ID), identification information of the restricted area (also referred to as an area ID), and the date and time of the capturing. The area ID may be a floor number or a room number. Further, in the present embodiment, as an example, the communication unit 203 acquires the image data from the monitoring camera 40 via the dedicated line, but may acquire the image data via the communication network 10.

1.1(3-2-2). Communication Unit 411

The communication unit 411 communicates with an external device. For example, the communication unit 411 may communicate with the locking system 2 or the like via the communication network 10. The communication unit 411 may include a reception unit 4110, an acquisition unit 4111, and an access control unit 4112.

1.1(3-2-2-1). Reception Unit 4110

The reception unit 4110 receives an access request to the image data captured in the restricted area.

Here, the access request may be sent from the user terminal 3 The access request may include at least one of position information of the image data to be accessed, the camera ID of the monitoring camera 40 that has captured the image data, the area ID of the restricted area in which the image data has been captured, or the electric lock ID of the electric lock 20 that restricts entry to the restricted area. The position information of the image data may be an address in the image storage unit 410, or may be data in which the camera ID and the capturing time are associated with each other.

The access request may include the registration information registered in association with the key ID, and includes the registrant ID as an example in the present embodiment. However, the registration information is not necessarily included in the access request as long as the registration information is supplied from the user terminal 3 to the apparatus 41 in association with the access request. As an example, the registration information may be supplied from the user terminal 3 to the apparatus 41 before or after transmission of the access request.

The reception unit 4110 may supply the received access request to the access control unit 4112. In addition, the reception unit 4110 may supply at least the area ID, the camera ID, or the electric lock ID in the received access request to the acquisition unit 4111.

1.1(3-2-2-2). Acquisition Unit 4111

In a case where the access request to the image data captured in the restricted area is made in association with the registration information, the acquisition unit 4111 acquires, from the locking system 2, the registration information corresponding to the key ID that allows entry into the restricted area. In the present embodiment, as an example, in response to the access request including the registrant ID being made, the acquisition unit 4111 may acquire, from the storage unit 212 of the security server 21, the registrant ID corresponding to each key ID that allows entry into the restricted area in which the image data for which access is requested has been captured.

In a case where the address in the image storage unit 410 is included in the access request as the position information of the image data, the acquisition unit 4111 may detect the electric lock ID corresponding to the address in the access request with reference to a correspondence table between the address in the image storage unit 410 and the electric lock ID. In a case where the camera ID and the area ID are included in the access request, the acquisition unit 4111 may detect the electric lock ID corresponding to the camera ID and the area ID with reference to a correspondence table between at least one of the camera ID or the area ID and the electric lock ID. The acquisition unit 4111 may supply the detected electric lock ID to the security server 21, and may acquire, from the security server 21, the registrant ID corresponding to the key ID for which the locking/unlocking authority for the electric lock 20 of the electric lock ID is given. In a case where the electric lock ID is included in the access request, the acquisition unit 4111 may supply the electric lock ID to the security server 21 to acquire the registrant ID. The acquisition unit 4111 may supply each acquired registrant ID to the access control unit 4112.

1.1(3-2-2-3). Access Control Unit 4112

The access control unit 4112 permits only the registrant corresponding to the key ID that allows entry into the restricted area to access the image data captured in the restricted area by any of the plurality of monitoring cameras 40.

The access control unit 4112 may collate the registration information associated with the access request with the registration information acquired by the acquisition unit 4111 to determine whether to permit access. For example, the access control unit 4112 may collate the registrant ID in the access request supplied from the reception unit 4110 with each registrant ID supplied from the acquisition unit 4111. The access control unit 4112 may permit access to the user terminal 3 that sent the access request in response to the presence of a matching registrant ID as a result of the collation.

In a case where the position information of the image data is included in the access request, the access control unit 4112 may permit access to the image data in the image storage unit 410 corresponding to the position information.

In a case where the camera ID or the area ID is included in the access request, the access control unit 4112 may permit access to the image data stored in the image storage unit 410 in association with the camera ID or the area ID. In a case where the plurality of monitoring cameras 40 are disposed in a single restricted area, and a plurality of pieces of image data captured by the plurality of monitoring cameras 40 are stored in the image storage unit 410 in association with a single area ID, and where the area ID is included in the access request, the access control unit 4112 may permit access to each of the plurality of pieces of image data stored in the image storage unit 410 in association with the area ID.

In a case where the electric lock ID is included in the access request, the access control unit 4112 may detect the camera ID or the area ID corresponding to the electric lock ID with reference to a correspondence table between the electric lock ID and at least one of the camera ID or the area ID. The access control unit 4112 may permit access to the image data stored in the image storage unit 410 in association with the detected camera ID and area ID.

1.1(4). Effects Obtained from Apparatus 41

According to the apparatus 41 described above, only the registrant corresponding to the key ID that allows entry into the restricted area is permitted to access the image data captured in the restricted area by any of the monitoring cameras 40. Therefore, the access to the image data captured in the restricted area can be restricted to registrants who can enter the restricted area. In addition, such an effect can be obtained even if the apparatus 41 is not necessarily provided to be communicable with the locking system 2. Therefore, even in a case where the monitoring system 2 is newly added in a situation where the existing locking system 2 is already installed, the access to the image data captured in the restricted area can be restricted to registrants who can enter the restricted area.

In addition, in a case where the access request to the image data captured in the restricted area is made in association with the registration information corresponding to the key ID, the registration information corresponding to the key ID that allows entry into the restricted area is acquired from the locking system 2, and it is determined whether the access is permitted by collating the registration information. Therefore, even in a case where the authority to enter the restricted area is changed in the locking system 2, it is possible to restrict the access to the image data by matching the access authority to the image data captured in the restricted area with the entry authority set in the locking system 2.

1.2. Operation of Apparatus 41

Figure 2:
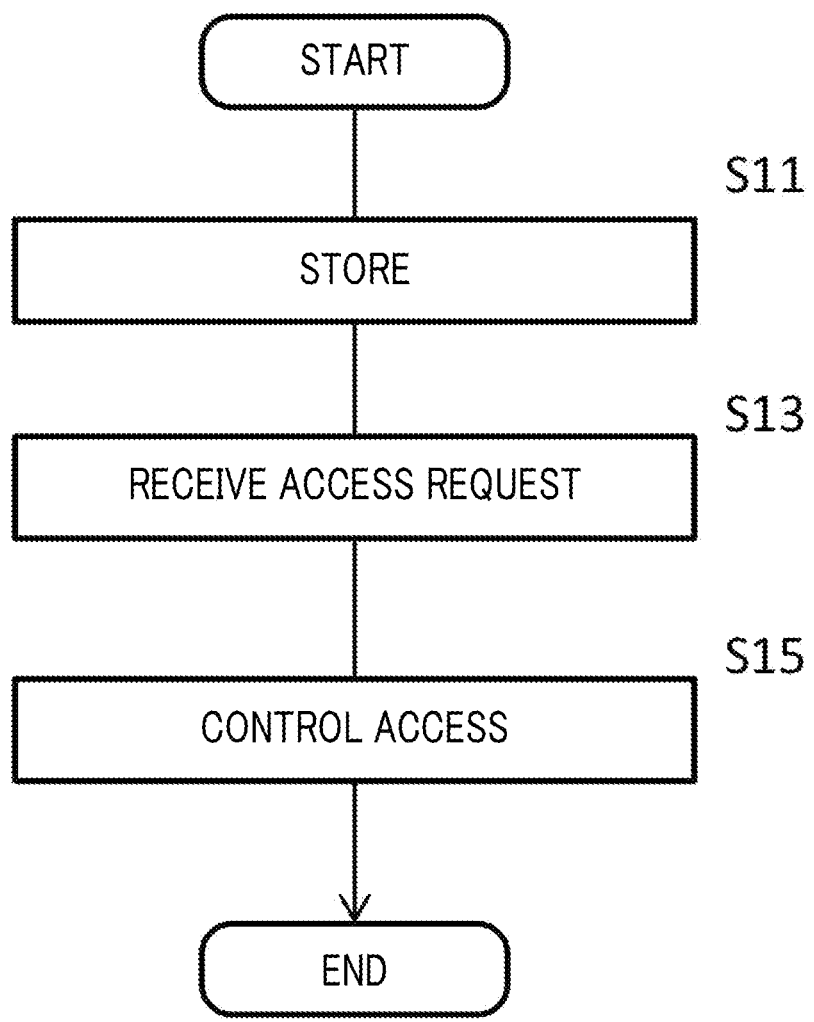
FIG. 2 illustrates the operation of an apparatus 41.

FIG. 2 illustrates the operation of the apparatus 41. The apparatus 41 controls the access to the image data by performing the processing of Steps S11 to S15.

In Step S11, the image storage unit 410 stores the image data captured by each of the plurality of monitoring cameras 40.

In Step S13, the reception unit 4110 receives an access request from the user terminal 3 of the registrant corresponding to the key ID. The access request may include a registrant ID, position information of image data, and the like.

In Step S15, the access control unit 4112 permits only the registrant corresponding to the key ID that allows entry into the restricted area to access the image data captured in the restricted area. In a case where the access is permitted, the access control unit 4112 may permit the user terminal 3 that has sent the access request to read the image data stored in the image storage unit 410.

1.3. Modification of First Embodiment

Note that, in the first embodiment described above, the reception unit 4110 has been described as receiving an access request to image data, but may further receive an access request to history data of locking/unlocking (in the present modification, history data stored in the storage unit 212 of the security server 21 as an example).

For example, the reception unit 4110 may receive an access request to history data (also referred to as history data of locking/unlocking of one restricted area) created by the electric lock 20 that restricts entry to one restricted area. The access request may be sent from the user terminal 3 and may include at least one of the area ID of the corresponding restricted area or the electric lock ID of the corresponding electric lock 20. The access request may include the camera ID of the monitoring camera 40 disposed in the corresponding restricted area instead of the area ID and the electric lock ID. In addition, the access request may include the registration information corresponding to the key ID, and includes the registrant ID as an example in the present embodiment. However, the registration information is not necessarily included in the access request as long as the registration information is supplied from the user terminal 3 to the apparatus 41 in association with the access request.

The reception unit 4110 may supply the received access request to the access control unit 4112. In addition, the reception unit 4110 may supply at least the area ID, the camera ID, or the electric lock ID in the received access request to the acquisition unit 4111.

In a case where the access request to the history data of locking/unlocking of one restricted area is made in association with the registration information corresponding to the key ID, the acquisition unit 4111 may acquire the registrant ID corresponding to the key ID that allows entry into the one restricted area from the locking system 2 similarly in the embodiment described above. The acquisition unit 4111 may acquire one or more registrant IDs from the security server 21 of the locking system 2. The acquisition unit 4111 may supply each acquired registrant ID to the access control unit 4112.

In a case where there is an access request to the history data of locking/unlocking of one restricted area, the access control unit 4112 may permit only a registrant corresponding to the key ID that allows entry into the one restricted area to access the history data. The access control unit 4112 may determine whether to permit access using the registrant ID similarly to the first embodiment described above.

In a case where access is permitted, the access control unit 4112 may cause the communication unit 210 of the security server 21 to permit access to the corresponding history data from the user terminal 3 which is the origin of the access request. For example, the access control unit 4112 may transfer the registration information associated with the access request, and the area ID and the electric lock ID to the communication unit 210 of the security server 21 to cause it to permit the user terminal 3 of the origin of the access request to read the history data.

According to the above modification, only the registrant corresponding to the key ID that allows entry into one restricted area is permitted to access the history data stored in the electric lock 20 that restricts entry to the one restricted area. Therefore, the access to the history data of entry to each restricted area can be restricted to a registrant who is allowed to enter the restricted area.

In the modification described above, the history data of locking/unlocking is stored in the security server 21. However, in addition to or instead of this, the history data may be stored in the apparatus 41. In this case, the access control unit 4112 may permit the user terminal 3 permitted to access the history data to read the history data in the apparatus 41.

2. Second Embodiment 2.1. Security System 1A

Figure 3:
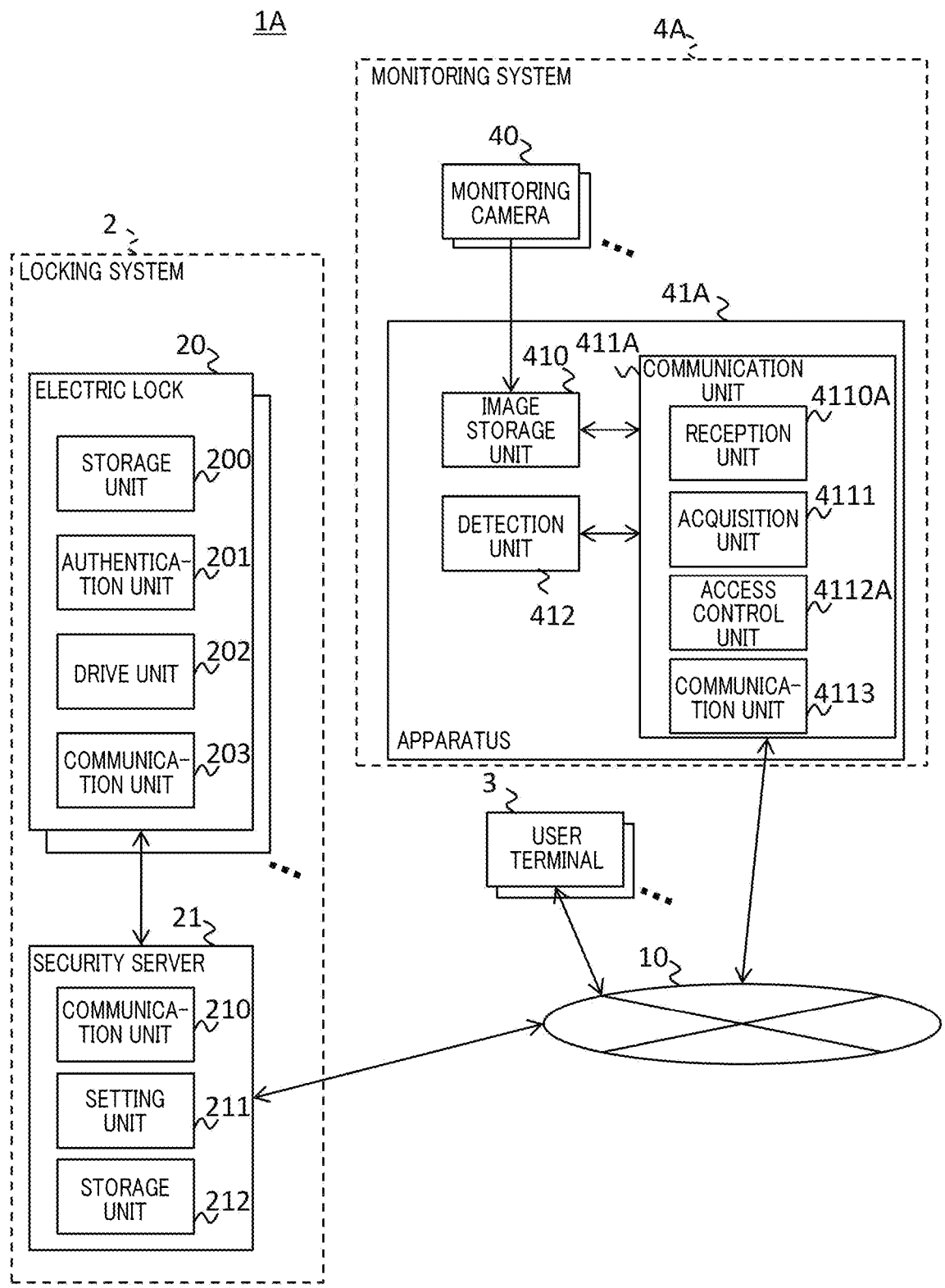
FIG. 3 illustrates a security system 1A according to a second embodiment.

FIG. 3 illustrates a security system 1A according to a second embodiment. The monitoring system 4A of the security system 1A includes an apparatus 41A. In the security system 1A according to the present embodiment, substantially the same components as those of the security system 1 illustrated in FIG. 1 are denoted by the same reference numerals, and description thereof will be omitted.

2.1(1). Apparatus 41A

The apparatus 41A includes a detection unit 412 and a communication unit 411A.

2.1(1-1). Detection Unit 412

The detection unit 412 detects an abnormality in each restricted area. The detection unit 412 may supply a detection signal indicating that an abnormality is detected to the communication unit 411A. The detection signal may include an area ID of the restricted area in which the abnormality has been detected and a camera ID of a monitoring camera 40 disposed in the restricted area.

For example, in response to a plurality of persons entering one restricted area while the electric lock 20 that restricts entry to the one restricted area among the plurality of electric locks 20 is unlocked once, the detection unit 412 may detect that there is an abnormality in the one restricted area. For example, the detection unit 412 may analyze an image captured by the monitoring camera 40 facing the entrance of the restricted area. According to this analysis, the detection unit 412 may set the period from the opening to the closing of the entrance to the period in which the electric lock 20 is unlocked once, or may set the period from the turning-on of an indicator indicating the unlocking of the electric lock 20 to the turning-off of the indicator to the period in which the electric lock 20 is unlocked once. In addition, the detection unit 412 may count the number of persons who have entered the restricted area.

Additionally or alternatively, the detection unit 412 may include at least one sensor for detecting an abnormality in the restricted area. For example, the detection unit 412 may include any of an intrusion detection sensor that detects intrusion into the restricted area, a human sensor that detects a human body in the restricted area, an opening/closing sensor that detects opening/closing of a door or a window in the restricted area, and a fire sensor that detects generation of heat or smoke in the restricted area. The detection unit 412 may include an ultrasonic sensor, a microwave sensor, an infrared sensor, a wire sensor, a trap sensor, an electric field sensor, a magnet sensor, a temperature sensor, and the like.

2.1(1-2). Communication Unit 411A

The communication unit 411A includes a transmission unit 4113, a reception unit 4110A, and an access control unit 4112A.

2.1(1-2-1). Transmission Unit 4113

The transmission unit 4113 transmits a message (also referred to as an abnormality message) to an address associated with a key ID that allows entry into the restricted area in which the abnormality has been detected by the detection unit 412. For example, the apparatus 41A may store an e-mail address of the registrant corresponding to each key ID that allows entry into the restricted area in association with the area ID of each restricted area, and the transmission unit 4113 may transmit the abnormality message to the e-mail address associated with the area ID of the restricted area in which the abnormality has been detected.

The abnormality message may include position information of the image data captured in the restricted area in which the abnormality has been detected. The position information included in the abnormality message may indicate the position of the image data captured at the detection timing of the abnormality. The position information included in the abnormality message may be an address in the image storage unit 410, or may be data in which at least one of the camera ID or the area ID is associated with the capturing time.

2.1(1-2-2). Reception Unit 4110A

The reception unit 4110A receives an access request to the image data captured in the restricted area. The access request may be sent in response to the abnormality message, or may be sent independently of the abnormality message.

The access request sent in response to the abnormality message may be sent from the user terminal 3 similarly to the access request sent independently of the abnormality message. However, the access request sent in response to the abnormality message may include the position information (in the present embodiment, as an example, the position information of the image data captured at the detection timing of the abnormality in the restricted area in which the abnormality has been detected) included in the abnormality message. In addition, the access request sent in response to the abnormality message may include information indicating that the access request is sent in response to the abnormality message, and for example, may include identification information of the abnormality message. In addition, the access request sent in response to the abnormality message may not be made in association with the registration information (in the present embodiment, the registrant ID as an example) registered in association with the key ID.

In a case where receiving an access request sent independently of the abnormality message, the reception unit 4110A may supply the access request to the access control unit 4112 and supply at least the area ID, the camera ID, or the electric lock ID in the access request to the acquisition unit 4111.

In a case where the access request sent in response to the abnormality message is received, the reception unit 4110A may supply the access request to the access control unit 4112. In this case, the reception unit 4110A may not supply the area ID, the camera ID, the electric lock ID, and the like to the acquisition unit 4111.

2.1(1-2-3). Access Control Unit 4112A

In a case where an access request is sent independently of the abnormality message, the access control unit 4112A may perform access control similarly to the first embodiment described above. For example, the access control unit 4112A may collate the registration information associated with the access request with the registration information supplied from the acquisition unit 4111 and permit the access in response to the presence of a matching registrant ID.

In a case where the access request is sent in response to the abnormality message, the access control unit 4112A may permit the sender of the access request to access the image data captured in the restricted area in which the abnormality has been detected. The access control unit 4112A may permit access to the user terminal 3 that has sent the access request in response to the access request including information indicating that the access request has been sent in response to the abnormality message.

Here, the access request sent in response to the abnormality message includes the position information included in the abnormality message, in the present embodiment, as an example, the position information of the image data captured at the detection timing of the abnormality in the restricted area in which the abnormality has been detected. The access control unit 4112A may permit access to the image data in the image storage unit 410 corresponding to the position information.

2.1(2). Effects Obtained from Apparatus 41A

According to the apparatus 41A described above, the message is transmitted to the address associated with the key ID that allows entry into the restricted area in which the abnormality has been detected, and the sender of the access request to the image data in response to the message is permitted to access the image data captured in the restricted area. Therefore, the registrant who can enter the restricted area in which the abnormality has been detected can be permitted to access the image data captured in the restricted area.

In addition, in response to a plurality of persons entering one restricted area while the electric lock that restricts entry to the one restricted area is unlocked once, it is detected that there is an abnormality inside the one restricted area. Therefore, in a case where a person whose authority is unknown enters the restricted area by piggybacking on the registrant of the key ID having the entry authority, the abnormality message can be transmitted to the registrant who can enter the restricted area.

Further, the position information of the image data captured in the restricted area in which the abnormality is detected (in the present embodiment, as an example, the position information of the image data captured at the detection timing of the abnormality in the restricted area in which the abnormality has been detected) is included in the abnormality message and transmitted, and is used for the access request. Therefore, it is possible to save time and effort to search for the image data.

2.2. Operation of Apparatus 41A

Figure 4:
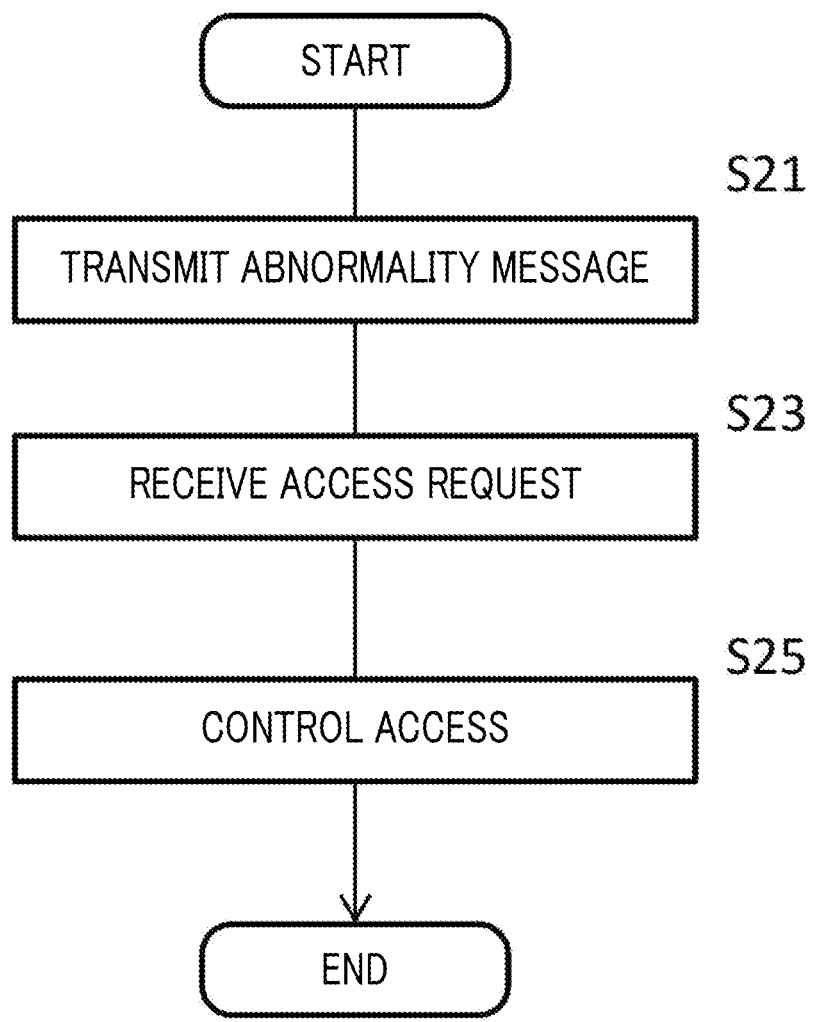
FIG. 4 illustrates the operation of an apparatus 41A.

FIG. 4 illustrates the operation of the apparatus 41A. The apparatus 41A controls access to image data by performing the processing of Steps S21 to S25. Note that the processing of Steps S21 to S25 may be performed in parallel with the processing of Steps S11 to S25 in the first embodiment described above.

In Step S21, in response to the detection unit 412 detecting an abnormality in the restricted area, the transmission unit 4113 transmits the abnormality message to the address associated with the key ID that allows entry into the restricted area. The transmission unit 4113 may transmit the abnormality message to each address associated with a plurality of key IDs that allow entry into the restricted area in which the abnormality has been detected.

In Step S23, the reception unit 4110A receives the access request from the user terminal 3 of the registrant corresponding to each key ID. The access request may include a registrant ID, position information of the image data, information (for example, identification information of the abnormality message) indicating that it has been sent in response to the abnormality message, and the like.

In Step S25, the access control unit 4112A permits the sender of each access request to access the image data captured in the restricted area in which the abnormality has been detected. The access control unit 4112A may permit each user terminal 3 that has sent the access request to read the image data stored in the image storage unit 410.

Here, the access control unit 4112A may permit access to the image data captured in the period including the detection timing of the abnormality among the image data captured in the restricted area in which the abnormality has been detected.

In the present embodiment, as an example, the position information included in the access request may indicate the position of the image data captured at the detection timing of the abnormality in the restricted area in which the abnormality has been detected. The position information may indicate an address in the image storage unit 410, or may indicate at least one of the camera ID or the area ID, and the capturing time. In a case where the position information indicates an address in the image storage unit 410, the access control unit 4112A may permit access to image data within an arbitrary address range including the address indicated by the position information. In a case where the position information indicates the capturing time, the access control unit 4112A may permit access to the image data within an arbitrary period including the capturing time.

According to the above operation, the message is transmitted to the plurality of addresses associated with the plurality of key IDs that allow entry into the restricted area in which the abnormality has been detected. Therefore, unlike the case where the message is transmitted only to some malicious registrants, it is possible to reliably notify the non-malicious registrants of the abnormality in the restricted area.

In addition, since the access to the image data captured in the period including the detection timing of the abnormality is permitted, it is possible to save time and effort to search for the abnormality in the image data.

2.3. Modification of Second Embodiment

In the second embodiment described above, the description has been given assuming that the position information of the image data captured in the restricted area in which the abnormality has been detected is included in the abnormality message and the access request, but a link to the image data captured in the restricted area in which the abnormality has been detected may be included. Also in this case, it is possible to save time and effort for searching for the image data.

Further, the description has been given assuming that the transmission unit 4113 transmits the abnormality message to each address associated with a plurality of key IDs that allow entry into the restricted area in which the abnormality has been detected, but the abnormality message may be transmitted to a plurality of addresses in a stepwise manner. For example, priority may be set to a plurality of key IDs that allow entry into the restricted area in accordance with the position, class, or the like of the registrant. The transmission unit 4113 may transmit the abnormality messages in order from the address of the key ID having the highest priority, and an abnormality message may be transmitted to the address of the key ID having the next highest priority in response to the fact that the reception unit 4110A does not receive the access request sent in response to the abnormality message.

In addition, the description has been given assuming that the access control unit 4112A controls the access to the image data, but the access to the history data of the locking/unlocking may be controlled similarly to the modification of the first embodiment described above.

3. Third Embodiment

3.1. Security System 1B

Figure 5:
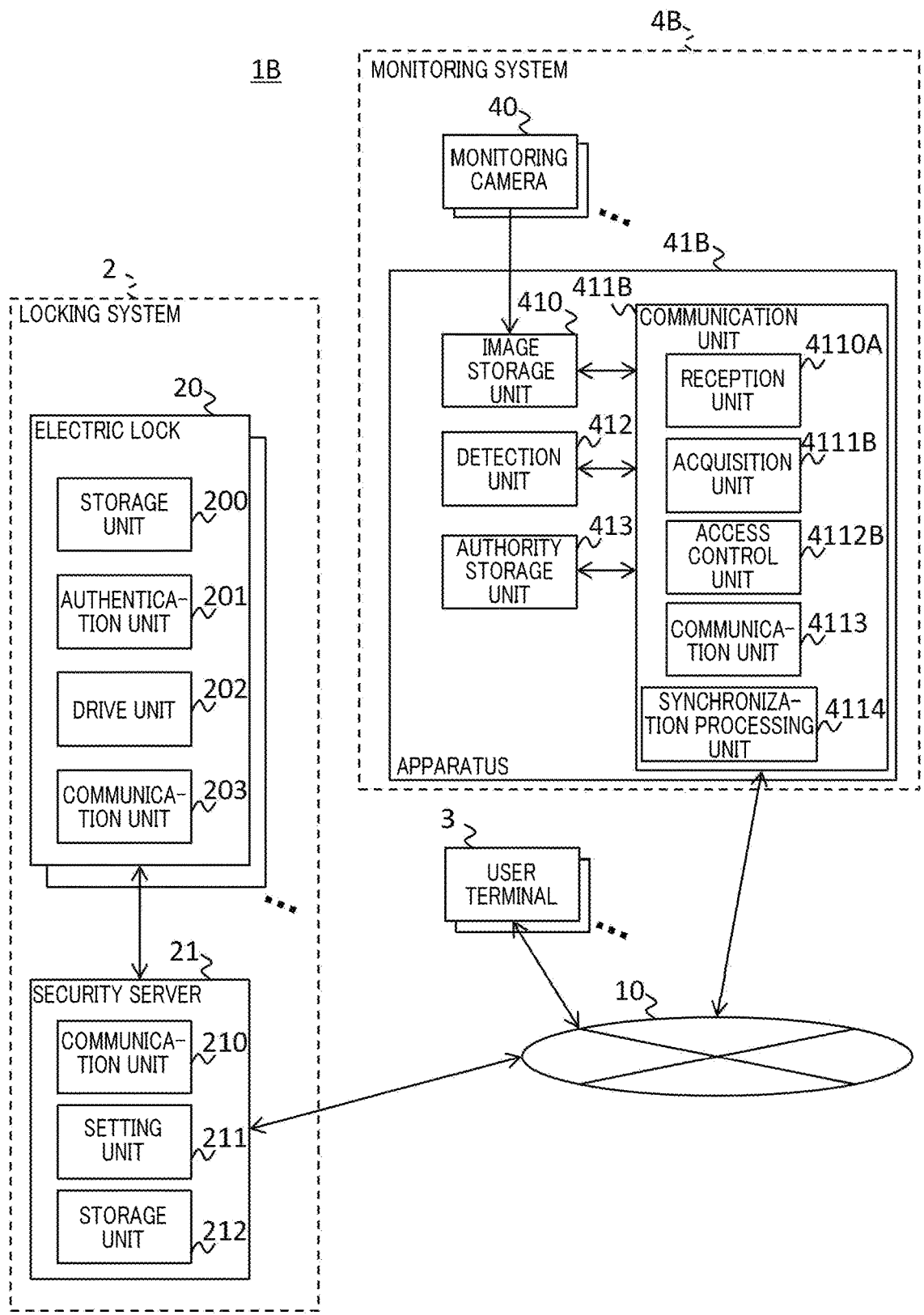
FIG. 5 illustrates a security system 1B according to a third embodiment.

FIG. 5 illustrates a security system 1B according to a third embodiment. A monitoring system 4B of the security system 1B includes an apparatus 41B. Note that, in the security system 1B according to the present embodiment, substantially the same components as those of the security systems 1 and 1A illustrated in FIG. 1 and FIG. 3 are denoted by the same reference numerals, and description thereof will be omitted.

3.1(1). Apparatus 41B

The apparatus 41B includes an authority storage unit 413 and a communication unit 411B.

3.1(1-1). Authority Storage Unit 413

The authority storage unit 413 is an example of a second storage unit, and stores, for each key ID, the locking/unlocking authority for each of the plurality of electric locks 20 and registration information (in the present embodiment, the registrant ID as an example) registered in association with the key ID. Similarly to the storage unit 212 of the security server 21, the authority storage unit 413 may store the key ID, the presence or absence of the locking/unlocking authority set in the key ID for the electric lock 20, and the registrant ID in association with each other for each of the electric lock IDs.

3.1(1-2). Communication Unit 411B

The communication unit 411B includes a synchronization processing unit 4114, an acquisition unit 4111B, and an access control unit 4112B.

3.1(1-2-1). Synchronization Processing Unit 4114

The synchronization processing unit 4114 synchronizes the locking/unlocking authority and the registration information for each key ID stored in the authority storage unit 413 with the locking/unlocking authority and the registration information for each key ID stored in the locking system 2. The synchronization processing unit 4114 may synchronize the authority storage unit 413 with the storage unit 212 of the security server 21.

The synchronization processing unit 4114 may perform synchronization periodically. Additionally or alternatively, in a case where the security server 21 notifies the apparatus 41B that the locking/unlocking authority and the registration information have been updated in the storage unit 212, the synchronization processing unit 4114 may perform synchronization every time the notification is received.

3.1(1-2-2). Acquisition Unit 4111B

In a case where an access request to the image data captured in the restricted area is made in association with the registration information corresponding to the key ID, the acquisition unit 4111B acquires, from the authority storage unit 413, the registration information corresponding to the key ID that allows entry into the restricted area. The acquisition unit 4111B may acquire the registration information similarly to the acquisition unit 4111 of the first embodiment except that the acquisition destination of the registration information is the authority storage unit 413. The acquisition unit 4111B may supply the acquired registration information to the access control unit 4112B.

3.1(1-2-3). Access Control Unit 4112B

The access control unit 4112B permits only the registrant corresponding to the key ID that allows entry into the restricted area to access the image data captured in the restricted area by any of the plurality of monitoring cameras 40.

The access control unit 4112B may collate the registration information associated with the access request with the registration information acquired by the acquisition unit 4111B to determine whether to permit the access, similarly to the access control unit 4112 in the first embodiment.

3.1(2). Effects Obtained from Apparatus 41B

According to the above apparatus 41B, for each key ID, the locking/unlocking authority for each of the plurality of electric locks 20 and the registration information registered in association with the key are stored in the authority storage unit 413, and in a case where an access request to the image data captured in the restricted area is made in association with the registration information corresponding to the key ID, the registration information corresponding to the key ID that allows entry into the restricted area is acquired from the authority storage unit 413, and the access is determined whether to be permitted by collating the registration information. Therefore, the processing time of the determination can be shortened as compared with the case of communicating with the locking system 2 to determine whether to permit.

The locking/unlocking authority and the registration information about each key ID stored in the locking system 2 are synchronized with the locking/unlocking authority and the registration information about each key ID stored in the authority storage unit 413. Therefore, even in a case where the authority to enter the restricted area is changed in the locking system 2, it is possible to restrict the access to the image data by matching the access authority to the image data captured in the restricted area with the entry authority set in the locking system 2.

3.2. Modification of Third Embodiment

Note that, in the third embodiment described above, it has been described that the access control unit 4112B determines the content of the access control according to the access request, but the content of the access control may be determined in advance before the access request is sent. For example, the access control unit 4112 may register an area ID of a restricted area that can be entered by a key of the key ID and a camera ID of the monitoring camera 40 disposed in the restricted area in advance in association with registration information of each key ID in the authority storage unit 413.

Further, the description has been given assuming that the communication unit 411B includes the synchronization processing unit 4114, but may not include the synchronization processing unit 4114.

In addition, the description has been given assuming that the access control unit 4112B controls the access to the image data, but the access to the history data of the locking/unlocking may be controlled similarly to the modification of the first embodiment described above. In this case, in a case where there is an access request to the history data of locking/unlocking of one restricted area, the access control unit 4112B may refer to the authority storage unit 413 and permit only a registrant with a key ID that allows entry into the one restricted area to access the history data. In a case where access is permitted, the access control unit 4112 may permit the communication unit 210 of the security server 21 to access the corresponding history data from the user terminal 3 which is the origin the access request.

4. Fourth Embodiment

4.1. Security System 1C

Figure 6:
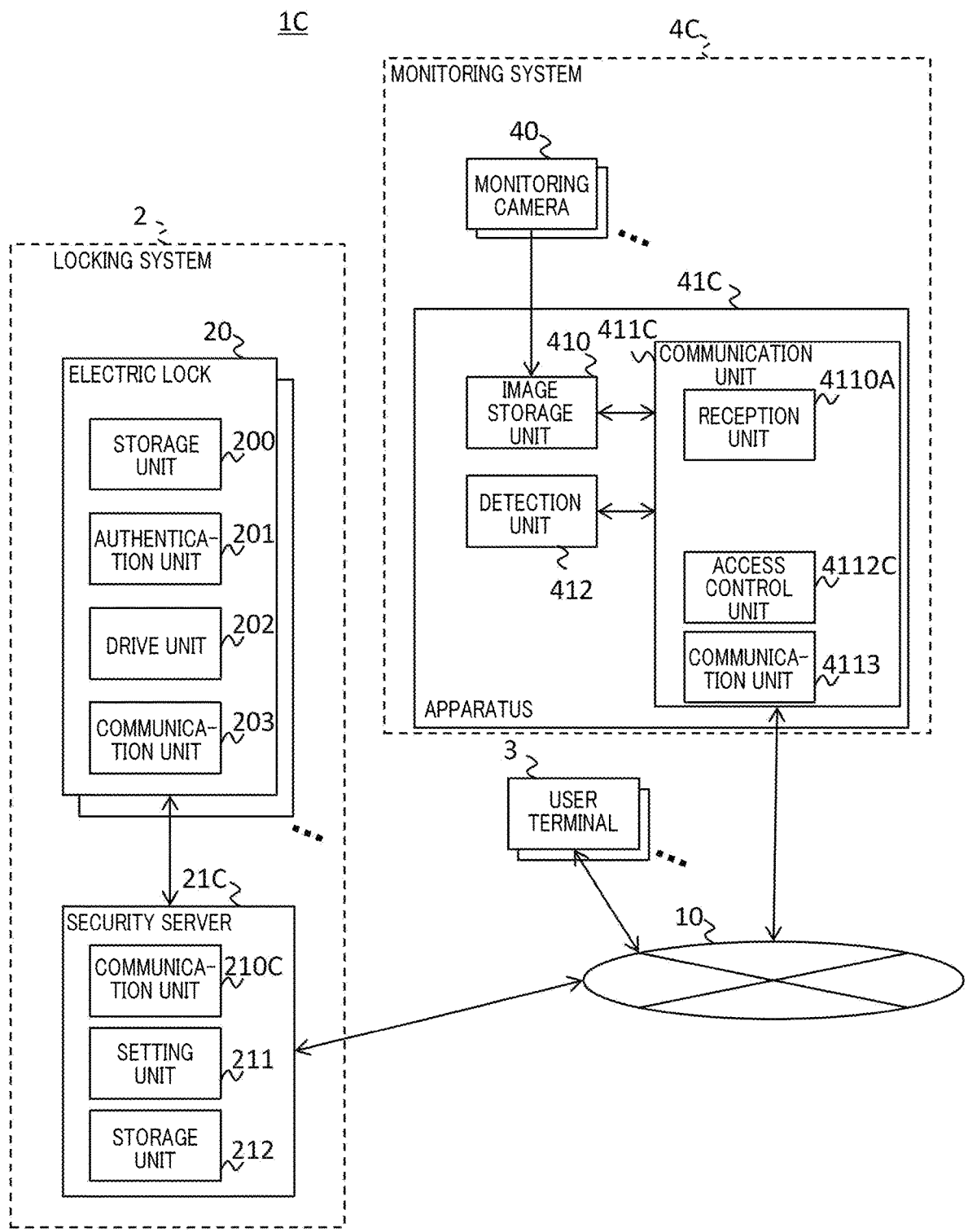
FIG. 6 illustrates a security system 1C according to a fourth embodiment.

FIG. 6 illustrates a security system 1C according to a fourth embodiment. A locking system 2C of the security system 1C includes a security server 21C, and a monitoring system 4C includes an apparatus 41C. Note that, in the security system 1C according to the present embodiment, substantially the same components as those of the security systems 1, 1A, and 1B illustrated in FIG. 1, FIG. 3, and FIG. 5 are denoted by the same reference numerals, and description thereof is omitted.

4.1(1). Security Server 21C

The security server 21C includes a communication unit 210C. The communication unit 210C may receive data obtained by combining the registrant ID and the electric lock ID from the apparatus 41C. The communication unit 210C may collate the received registrant ID with the registrant ID corresponding to each key ID having the locking/unlocking authority for the electric lock of the received electric lock ID, that is, the registrant ID of each key that allows entry into the restricted area in which entry is restricted by the electric lock, and supply the collation result to the apparatus 41C.

4.1(2). Apparatus 41C

The apparatus 41C includes a communication unit 411C.

4.1(2-1). Communication Unit 411C

The communication unit 411C includes an access control unit 4112C. Unlike the communication units 411, 411A and 411B of the first to third embodiments, the communication unit 411C may not include the acquisition units 4111 and 4111B.

4.1(2-1-1). Access Control Unit 4112C

The access control unit 4112C permits only the registrant of the key that allows entry into the restricted area to access the image data captured in the restricted area by any of the plurality of monitoring cameras 40.

In a case where the access request to the image data captured in the restricted area is made in association with the registration information corresponding to the key ID (in the present embodiment, the registrant ID as an example), the access control unit 4112C may cause the security server 21C to perform collation of the registration information associated with the access request with the registration information stored in the security server 21C in association with the key ID that allows entry into the restricted area.

For example, in a case where the access request includes the registrant ID and the electric lock ID, the access control unit 4112C may extract the registrant ID and the electric lock ID from the access request and supply them to the security server 21C. The access control unit 4112C may directly supply the access request to the security server 21C.

In a case where the access request includes the registrant ID, the camera ID, and the area ID, the access control unit 4112C may have a correspondence table of at least one of the camera ID or the area ID and the electric lock ID. In this case, the access control unit 4112C may detect the electric lock ID corresponding to the camera ID and the area ID in the access request with reference to the correspondence table, and supply the electric lock ID to the security server 21C in association with the registrant ID included in the access request.

The access control unit 4112C may receive the collation result from the security server 21C, and may permit access based on the result of the collation. For example, the access control unit 4112 may permit access to the user terminal 3 that has sent the access request in response to the presence of a matching registrant ID as a result of the collation.

4.1(3). Effects Obtained from Apparatus 41C

According to the above apparatus 41C, in a case where an access request to the image data captured in the restricted area is made in association with the registration information corresponding to the key ID, the security server 21C collates the registration information associated with the access request with the registration information stored in the security server 21C in association with the key ID that allows entry into the restricted area, and access is permitted based on a result of the collation. Therefore, the access to the image data can be restricted in accordance with the entry authority set in the security system.

4.2. Modification of Fourth Embodiment

In the fourth embodiment described above, the description has been given assuming that the access control unit 4112C controls the access to the image data, but the access to the history data of the locking/unlocking may be controlled similarly to the modification of the first embodiment described above. For example, in a case where the access request to the history data of locking/unlocking of one restricted area is made in association with the registration information corresponding to the key ID, the access control unit 4112C may cause the security server 21C to perform collation of the registration information associated with the access request with the registration information stored in the security server 21C in association with the key ID that allows entry into the one restricted area, and may permit only the registrant who can enter the one restricted area to access the history data. In a case where access is permitted, the access control unit 4112C may permit the communication unit 210C of the security server 21C to access the corresponding history data from the user terminal 3 which is the origin of the access request.

5. Fifth Embodiment

5.1. Security System 1D

Figure 7:
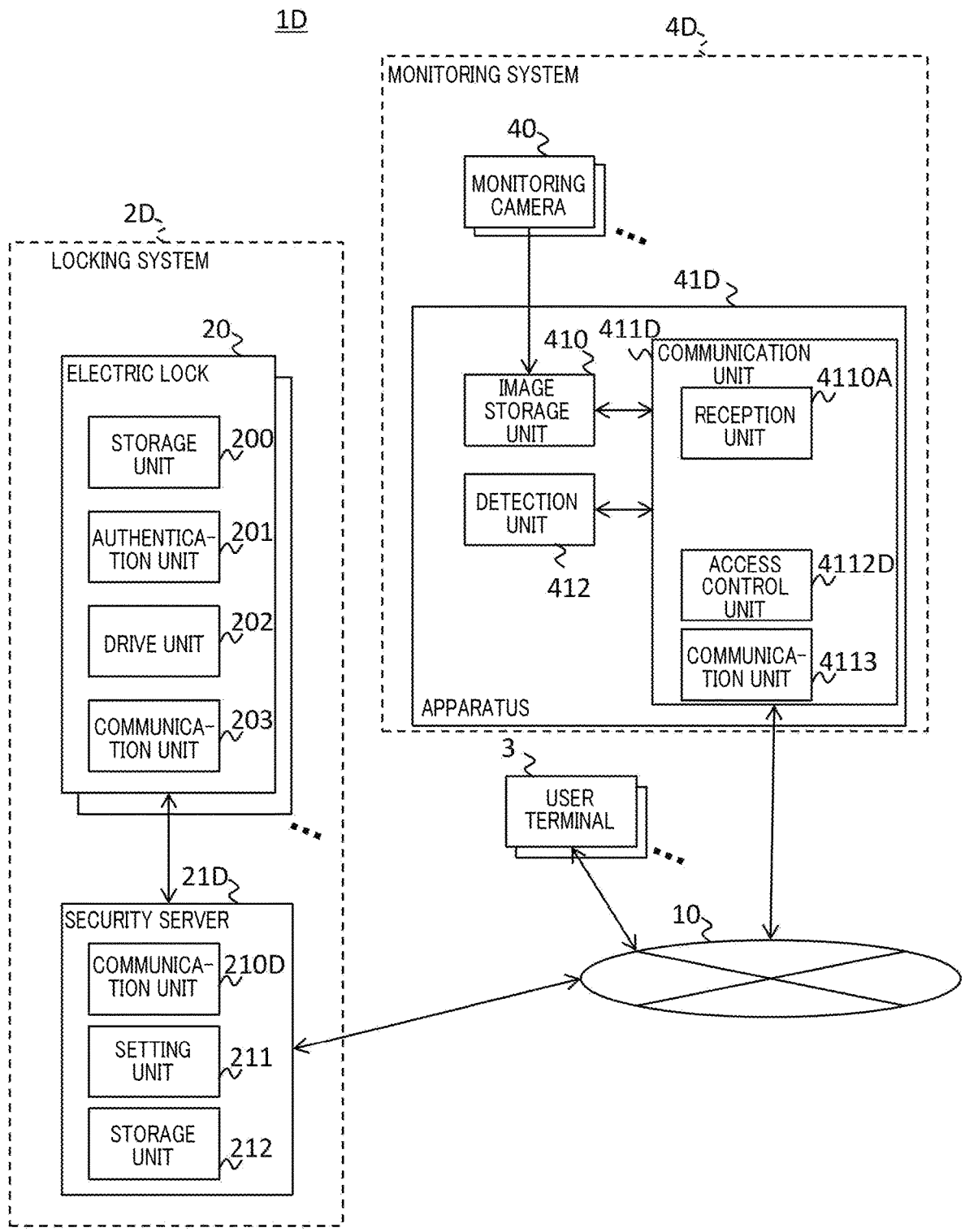
FIG. 7 illustrates a security system 1D according to a fifth embodiment.

FIG. 7 illustrates a security system 1D according to a fifth embodiment. A locking system 2D of the security system 1D includes a security server 21D, and a monitoring system 4D includes an apparatus 41D. Note that, in the security system 1D according to the present embodiment, substantially the same components as those of the security systems 1, and 1A to 1C illustrated in FIG. 1, FIG. 3, FIG. 5, and FIG. 6 are denoted by the same reference numerals, and description thereof is omitted.

5.1(1). Security Server 21D

The security server 21D in the present embodiment provides a registrant corresponding to each key ID with access to the image data captured in a restricted area in which the registrant has authority to enter.

The security server 21D may include a communication unit 210D. The communication unit 210D may perform authentication of a registrant corresponding to the key ID by using the registrant ID transmitted from the user terminal 3, and perform login to the user account corresponding to the registrant ID. The communication unit 210D may transmit an access request to the image data to the apparatus 41 according to the operation of the user terminal 3. The communication unit 210D may read the electric lock ID in which the locking/unlocking authority is given to the key ID corresponding to the registrant ID from the storage unit 212 and include the electric lock ID in the access request. As a result, an access request to the image data captured in the restricted area to which entry is allowed by the key of the registrant ID is sent from the user terminal 3 to the apparatus 41D via the security server 21D.

5.1(2). Apparatus 41D

The apparatus 41D includes a communication unit 411D.

5.1(2-1). Communication Unit 411D

The communication unit 411D includes an access control unit 4112D.

5.1(2-1-1). Access Control Unit 4112D

In a case where a user authenticated as a registrant in the locking system 2D sends, via the locking system 2D, an access request to access the image data captured in a restricted area to which the user is allowed to enter, the access control unit 4112 permits the user to access the image data.

The access control unit 4112D may detect the camera ID and the area ID corresponding to the electric lock ID included in the access request with reference to a correspondence table between at least one of the camera ID or the area ID and the electric lock ID. The access control unit 4112D may permit the security server 21D to access the image data stored in the image storage unit 410 in association with the detected camera ID and area ID. As a result, the user terminal 3 can access the image data via the security server 21D.

5.1(3). Effects Obtained from Apparatus 41D

According to the above apparatus 41D, in a case where the user authenticated as the registrant in the locking system 2D makes an access request, via the locking system 2D, to the image data of the restricted area to which the user is allowed to enter, the user is permitted to access the image data. Therefore, the access to the image data can be restricted in accordance with the entry authority set in the locking system 2D.

6. Modification

In the first to fifth embodiments and the modifications, the key ID has been described assuming as the authentication information, but in addition to or instead of this, the biometric information (information on at least one of a person's face, fingerprint, iris, or vein as an example) of the registrant may be used as the authentication information. In this case, the authentication unit 201 may perform biometric authentication of the key user and determine whether locking/unlocking can be performed according to the result. The biometric authentication function may be included in the authentication unit 201 by default, or may be added by extension of the function of the authentication unit 201 after installation of the electric lock 20. The storage unit 212 and the authority storage unit 413 may store the authority to lock and unlock each of the plurality of electric locks 20 in association with each piece of authentication information (for example, key ID and biometric information), and the registration information registered in association with the authentication information.

The image storage unit 410 has been described assuming that the image data is stored in association with both the camera ID and the area ID. However, the image data may be stored in association with only one of the camera ID and the area ID.

Further, in the third to fifth embodiments and the modifications, the apparatuses 41B to 41D have been described assuming as including the detection unit 412 and the transmission unit 4113, but may not include them.

Various embodiments of the present invention may also be described with reference to flowcharts and block diagrams, where the blocks may represent (1) steps of processes in which operations are performed or (2) sections of apparatuses responsible for performing operations. Certain stages and sections may be implemented by dedicated circuitry, programmable circuitry provided with computer-readable instructions stored on a computer-readable medium, and/or a processor provided with computer-readable instructions stored on a computer-readable medium. The dedicated circuitry may include digital and/or analog hardware circuits, and may include integrated circuits (ICs) and/or discrete circuits. The programmable circuitry may include reconfigurable hardware circuits including memory elements such as logic AND, logic OR, logic XOR, logic NAND, logic NOR, and other logic operations, flip-flops, registers, field programmable gate arrays (FPGA), programmable logic arrays (PLA), and the like.

The computer-readable medium may include any tangible device capable of storing instructions for execution by a suitable device, so that the computer-readable medium having the instructions stored therein will have a product including instructions that can be executed to create means for performing the operations specified in flowcharts or block diagrams. Examples of the computer-readable medium may include an electronic storage medium, a magnetic storage medium, an optical storage medium, an electromagnetic storage medium, a semiconductor storage medium, and the like. More specific examples of the computer-readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a Blu-ray (registered trademark) disk, a memory stick, an integrated circuit card, and the like.

The computer-readable instructions may include source code or object code written in any combination of one or more programming languages, including assembler instructions, instruction-set-architecture (ISA) instructions, machine instructions, machine-dependent instructions, microcode, firmware instructions, state-setting data, or an object oriented programming language such as Smalltalk, JAVA (registered trademark), C++, or the like, and conventional procedural programming languages such as the "C" programming language or similar programming languages.

Computer-readable instructions may be provided to a processor of a general-purpose computer, special purpose computer, or other programmable data processing apparatus, or to a programmable circuitry, locally or via a local area network (LAN), wide area network (WAN) such as the Internet, or the like, to execute the computer-readable instructions to create means for performing operations specified in the flowcharts or block diagrams. Examples of the processor include a computer processor, a processing unit, a microprocessor, a digital signal processor, a controller, a microcontroller, and the like.

Figure 8:
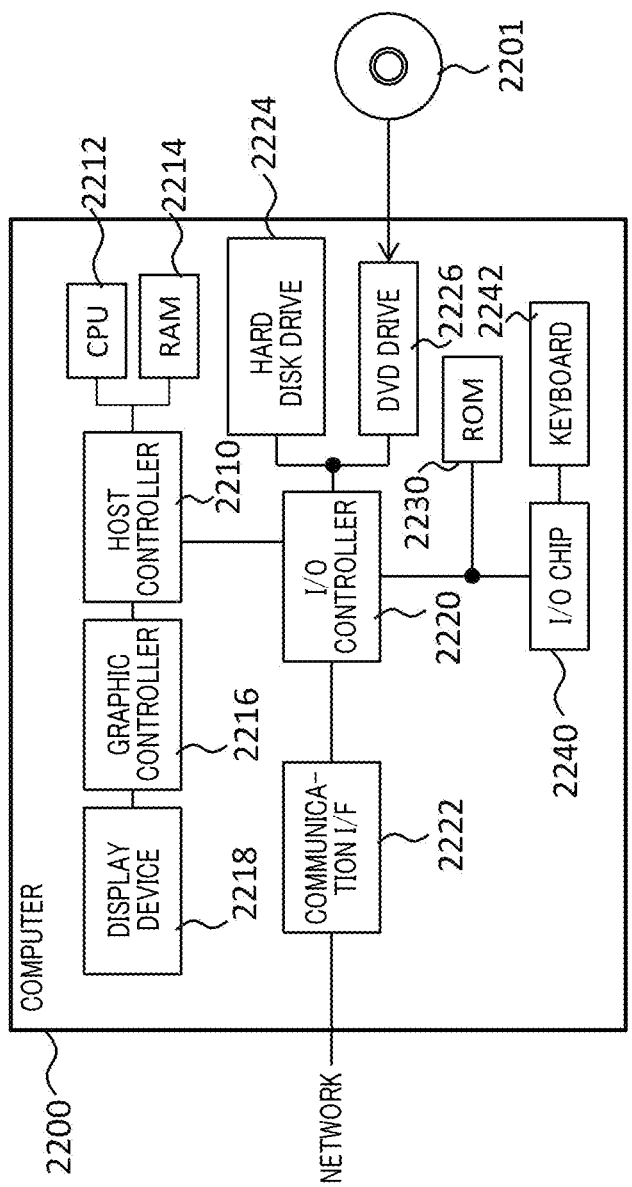
FIG. 8 illustrates an example of a computer 2200 in which a plurality of aspects of the present invention may be embodied in whole or in part.

FIG. 8 illustrates an example of a computer 2200 in which a plurality of aspects of the present invention may be embodied in whole or in part. A program that is installed in the computer 2200 can cause the computer 2200 to function as or execute operations associated with the apparatus of the embodiment of the present invention or one or more sections thereof, and/or cause the computer 2200 to execute the method of the embodiment of the present invention or steps thereof. Such program may be executed by a CPU 2212 so as to cause the computer 2200 to execute certain operations associated with some or all of the blocks of flowcharts and block diagrams described herein.

The computer 2200 according to the present embodiment includes the CPU 2212, a RAM 2214, a graphic controller 2216, and a display device 2218, which are interconnected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphic controller 2216 acquires image data generated by the CPU 2212 in a frame buffer or the like provided in the RAM 2214 or in itself, such that the image data is displayed on the display device 2218.

The communication interface 2222 communicates with other electronic devices via a network. The hard disk drive 2224 stores programs and data used by the CPU 2212 in the computer 2200. The DVD-ROM drive 2226 reads a program or data from the DVD-ROM 2201 and provides the program or data to the hard disk drive 2224 via the RAM 2214. The IC card drive reads programs and data from the IC card, and/or writes programs and data to the IC card.

The ROM 2230 stores therein boot programs and the like executed by the computer 2200 at the time of activation, and/or programs that depend on the hardware of the computer 2200. The input/output chip 2240 may also connect various input/output units to the input/output controller 2220 via parallel ports, serial ports, keyboard ports, mouse ports, or the like.

The program is provided by a computer-readable medium such as the DVD-ROM 2201 or the IC card. The program is read from a computer-readable medium, installed in the hard disk drive 2224, the RAM 2214, or the ROM 2230 which are also examples of the computer-readable medium, and executed by the CPU 2212. The information processing written in these programs is read by the computer 2200 and provides cooperation between the programs and various types of hardware resources. An apparatus or a method may be constituted by realizing the operations or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. Under the control of the CPU 2212, the communication interface 2222 reads transmission data stored in a transmission buffer processing area provided in a recording medium such as the RAM 2214, the hard disk drive 2224, the DVD-ROM 2201, or the IC card, transmits the read transmission data to the network, or writes reception data received from the network in a reception buffer processing area or the like provided on the recording medium.

In addition, the CPU 2212 may cause the RAM 2214 to read all or a necessary part of a file or database stored in an external recording medium such as the hard disk drive 2224, the DVD-ROM drive 2226 (DVD-ROM 2201), the IC card, or the like, and may execute various types of processing on data on the RAM 2214. Next, the CPU 2212 writes back the processed data to the external recording medium.

Various types of information such as various types of programs, data, tables, and databases may be stored in a recording medium and subjected to information processing. The CPU 2212 may execute various types of processing on the data read from the RAM 2214, including various types of operations, information processing, conditional determination, conditional branching, unconditional branching, information retrieval/replacement, and the like, which are described throughout the present disclosure and specified by a command sequence of a program, and writes back the results to the RAM 2214. Further, the CPU 2212 may retrieve information in a file, a database, or the like in the recording medium. For example, in a case where a plurality of entries each having the attribute value of a first attribute associated with the attribute value of a second attribute is stored in the recording medium, the CPU 2212 may retrieve the plurality of entries for an entry matching the condition in which the attribute value of the first attribute is specified, read the attribute value of the second attribute stored in the entry, and thereby acquire the attribute value of the second attribute associated with the first attribute satisfying the predetermined condition.

The programs or software modules described above may be stored in a computer-readable medium on or near the computer 2200. In addition, a recording medium such as a hard disk or a RAM provided in a server system connected to a dedicated communication network or the Internet can be used as a computer-readable medium, thereby providing a program to the computer 2200 via the network.

Although the present invention has been described using the embodiments, the technical scope of the present invention is not limited to the scope described in the above embodiments. It is apparent to those skilled in the art that various modifications or improvements can be made to the above embodiments. It is apparent from the description of the claims that modes to which such changes or improvements are added can also be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process.. Even if the process flow is described using phrases such as "first" or "next" in the claims, embodiments, or diagrams for convenience, it does not necessarily mean that the process must be performed in this order.

EXPLANATION OF REFERENCES

: security system
2: locking system
3: user terminal
4: monitoring system
10: communication network
20: electric lock
21: security server
40: monitoring camera
41: apparatus
200: storage unit
201: authentication unit
202: drive unit
203: communication unit
210: communication unit
211: setting unit
212: storage unit
410: image storage unit
411: communication unit
412: detection unit
413: authority storage unit
2200: computer
2201: DVD-ROM
2210: host controller
2212: CPU
2214: RAM
2216: graphic controller
2218: display device
2220: input/output controller
2222: communication interface
2224: hard disk drive
2226: DVD-ROM drive
2230: ROM
2240: input/output chip
2242: keyboard
4110: reception unit
4111: acquisition unit
4112: access control unit
4113: transmission unit
4114: synchronization processing unit

What is claimed is:

1. An apparatus comprising:
a first storage unit configured to store image data captured by each of a plurality of monitoring cameras disposed in a plurality of restricted areas in which entry is restricted by a plurality of electric locks according to an authority associated with each piece of authentication information; and
an access control unit configured to permit only a registrant corresponding to the authentication information that allows entry into the restricted area to access the image data captured in the restricted area by any of the plurality of monitoring cameras;
wherein the registrant requests the image data remotely via a communication network;
wherein
a security system corresponding to the plurality of electric locks is configured to store, for each piece of authentication information, a locking/unlocking authority for each of the plurality of electric locks and registration information registered in association with the authentication information, and
an acquisition unit is configured to acquire, from the security system, registration information corresponding to the authentication information that allows entry into the restricted area in a case where an access request to image data captured in the restricted area is made in association with registration information corresponding to the authentication information, wherein the access control unit collates the registration information associated with the access request with the registration information acquired by the acquisition unit to determine whether to permit access.

2. The apparatus according to claim 1, further comprising:
a second storage unit configured to store, for each piece of authentication information, a locking/unlocking authority for each of the plurality of electric locks and registration information registered in association with the authentication information; and
an acquisition unit configured to acquire, from the second storage unit, registration information corresponding to authentication information that allows entry into the restricted area in a case where an access request to image data captured in the restricted area is made in association with registration information corresponding to the authentication information, wherein
the access control unit is configured to determine whether to permit access by collating the registration information associated with the access request with the registration information acquired by the acquisition unit.

3. The apparatus according to claim 2, comprising:
a synchronization processing unit configured to synchronize a locking/unlocking authority and the registration information for each piece of authentication information stored in the second storage unit with a locking/unlocking authority and registration information for each piece of authentication information stored in the security system corresponding to the plurality of electric locks.

4. The apparatus according to claim 1, wherein
the security system corresponding to the plurality of electric locks is configured to store, for each piece of authentication information, a locking/unlocking authority for each of the plurality of electric locks and registration information registered in association with the authentication information, and
in a case where an access request to image data captured in a restricted area is made in association with registration information corresponding to the authentication information, the access control unit is configured to cause the security system to perform collation of the registration information associated with the access request with the registration information stored in the security system in association with the authentication information that allows entry into the restricted area, and permits access based on a result of the collation.

5. The apparatus according to claim 1, wherein
each electric lock creates history data of locking/unlocking including each piece of authentication information used for locking/unlocking, and
in a case where there is an access request to the history data created by an electric lock that restricts entry to one restricted area among the plurality of electric locks, the access control unit is configured to permit only a registrant corresponding to the authentication information that allows entry into the one restricted area to access the history data.

6. The apparatus according to claim 1, wherein
each electric lock creates history data of locking/unlocking including each piece of authentication information used for locking/unlocking, and
in a case where there is an access request to the history data created by an electric lock that restricts entry to one restricted area among the plurality of electric locks, the access control unit is configured to permit only a registrant corresponding to the authentication information that allows entry into the one restricted area to access the history data.

7. The apparatus according to claim 1, wherein
in a case where a user authenticated as the registrant sends an access request to image data captured in a restricted area in which entry is allowed via the security system, the access control unit is configured to permit access to the image data.

8. The apparatus according to claim 1, comprising:
a detection unit configured to detect an abnormality in each restricted area;
a transmission unit configured to transmit a message to an address associated with authentication information that allows entry into the restricted area in which an abnormality has been detected; and
a reception unit configured to receive an access request to an image data according to the message, wherein
the access control unit is configured to permit a sender of the access request to access the image data captured in the restricted area in which an abnormality has been detected.

9. The apparatus according to claim 1, further comprising:
a detection unit configured to detect an abnormality in each restricted area; a transmission unit configured to transmit a message to an address associated with authentication information that allows entry into the restricted area in which an abnormality has been detected; and
a reception unit configured to receive an access request to the image data according to the message, wherein
the access control unit is configured to permit a sender of the access request to access the image data captured in the restricted area in which an abnormality has been detected.

10. The apparatus according to claim 8, wherein
in response to a plurality of persons entering one restricted area while an electric lock that restricts entry to one restricted area among the plurality of electric locks is unlocked once, the detection unit detects that there is an abnormality in the one restricted area.

11. The apparatus according to claim 8, wherein
the transmission unit is configured to transmit the message including position information of image data captured in the restricted area in which an abnormality has been detected.

12. The apparatus according to claim 8, wherein
the transmission unit is configured to transmit the message including a link to image data captured in the restricted area in which an abnormality has been detected.

13. The apparatus according to claim 8, wherein
the transmission unit is configured to transmit the message to each address associated with a plurality of pieces of authentication information that allows entry into the restricted area in which an abnormality has been detected.

14. The apparatus according to claim 8, wherein
the access control unit is configured to permit access to image data captured in a period including a detection timing of an abnormality among image data captured in the restricted area in which an abnormality has been detected.

15. The apparatus according to claim 1, wherein
each piece of authentication information is at least one of identification information of a key used for locking/unlocking or biometric information of the registrant.

16. A system comprising:
the apparatus according to claim 1; and
a plurality of monitoring cameras that are disposed in a plurality of restricted areas where entry is restricted by a plurality of electric locks according to an authority associated with each piece of authentication information.

17. The system of claim 16, further comprising:
the plurality of electric locks.

18. A method comprising:
storing image data captured by each of a plurality of monitoring cameras disposed in a plurality of restricted areas in which entry is restricted by a plurality of electric locks according to an authority associated with each piece of authentication information; and
performing access control by permitting only a registrant corresponding to the authentication information that allows entry into the restricted area to access the image data captured in the restricted area by any of the plurality of monitoring cameras, wherein the registrant requests the image data remotely via a communication network;
storing, for each piece of authentication information, a locking/unlocking authority for each of the plurality of electric locks and registration information registered in association with the authentication information, and
acquiring registration information corresponding to the authentication information that allows entry into the restricted area in a case where an access request to image data captured in the restricted area is made in association with registration information corresponding to the authentication information, wherein
the registration information associated with the access request with the registration information is collated to determine whether to permit access.

19. An apparatus comprising:
a first storage unit configured to store image data captured by each of a plurality of monitoring cameras disposed in a plurality of restricted areas in which entry is restricted by a plurality of electric locks according to an authority associated with each piece of authentication information;
an access control unit configured to permit only a registrant corresponding to the authentication information that allows entry into the restricted area to access the image data captured in the restricted area by any of the plurality of monitoring cameras;
a second storage unit configured to store, for each piece of authentication information, a locking/unlocking authority for each of the plurality of electric locks and registration information registered in association with the authentication information; and
an acquisition unit configured to acquire, from the second storage unit, registration information corresponding to authentication information that allows entry into the restricted area in a case where an access request to image data captured in the restricted area is made in association with registration information corresponding to the authentication information, wherein
the access control unit is configured to determine whether to permit access by collating the registration information associated with the access request with the registration information acquired by the acquisition unit;
wherein the registrant requests the image data remotely via a communication network.

* * * * *